United States Patent
Kitamura et al.

(10) Patent No.: US 12,097,726 B2
(45) Date of Patent: Sep. 24, 2024

(54) TIRE

(71) Applicant: Sumitomo Rubber Industries, Ltd., Kobe (JP)

(72) Inventors: Yukako Kitamura, Kobe (JP); Yuya Meguro, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/988,877

(22) Filed: Nov. 17, 2022

(65) Prior Publication Data

US 2023/0191848 A1 Jun. 22, 2023

(30) Foreign Application Priority Data

Dec. 17, 2021 (JP) ................................ 2021-205183

(51) Int. Cl.
*B60C 11/03* (2006.01)
*B60C 11/12* (2006.01)

(52) U.S. Cl.
CPC ...... *B60C 11/0304* (2013.01); *B60C 11/0302* (2013.01); *B60C 11/1259* (2013.01); *B60C 11/1281* (2013.01)

(58) Field of Classification Search
CPC ............. B60C 11/0304; B60C 11/0302; B60C 11/1259; B60C 11/1281; B60C 11/125; B60C 11/1392; B60C 2011/1254; B60C 2011/0362; B60C 2011/1268; B60C 11/1236; B60C 11/1204; B60C 2011/0381
See application file for complete search history.

(56) References Cited

U.S. PATENT DOCUMENTS

| 2017/0297378 | A1 | 10/2017 | Honda |
| 2018/0086149 | A1* | 3/2018 | Hoshino ............. B60C 11/0304 |
| 2018/0170114 | A1 | 6/2018 | Hayashi |
| 2020/0164693 | A1 | 5/2020 | Hayashi |
| 2021/0170801 | A1* | 6/2021 | Watanabe ............. B60C 11/033 |
| 2022/0072910 | A1* | 3/2022 | Nakamura .......... B60C 11/0304 |
| 2022/0281266 | A1* | 9/2022 | Nakamura ............. B60C 11/032 |

FOREIGN PATENT DOCUMENTS

| DE | 10 2012 108 384 A1 | 3/2014 | |
| EP | 355636 A * | 2/1990 | ............. B60C 11/12 |
| EP | 2 711 200 A1 | 3/2014 | |

(Continued)

OTHER PUBLICATIONS

Extended European Search Report for European Application No. 22207567.3, dated May 12, 2023.

*Primary Examiner* — Justin R Fischer
*Assistant Examiner* — Brendon Charles Darby
(74) *Attorney, Agent, or Firm* — Birch, Stewart, Kolasch & Birch, LLP

(57) ABSTRACT

A tire comprises a tread portion including a first land portion provided with axially extending first lateral sipes. The first lateral sipe has a first sipe wall and a second sipe wall, and opens at a ground contacting top surface via a chamfer portion. The chamfer portion comprises a first sloped surface and a second sloped surface respectively connected to the first sipe wall and the second sipe wall. In a top view of the first land portion, the width W1 of the first sloped surface is larger than the width W2 of the second sloped surface.

15 Claims, 8 Drawing Sheets

(56) References Cited

FOREIGN PATENT DOCUMENTS

| | | |
|---|---|---|
| EP | 3 238 959 A1 | 11/2017 |
| EP | 4 173 846 A1 | 5/2023 |
| EP | 4 173 848 A1 | 5/2023 |
| JP | 2015-137015 A | 7/2015 |
| JP | 2017-1583 A | 1/2017 |
| JP | 2017-144761 A | 8/2017 |

* cited by examiner

TIRE

BACKGROUND OF THE INVENTION

Field of the Invention

The present disclosure relates to a tire.

Background Art

Patent Document 1 below discloses a tire in which steering stability on dry road surfaces and wet cornering performance are improved by improving lateral grooves and sipes provided in a first land portion.

Patent Document 1: Japanese Patent Application Publication No. 2015-137015

SUMMARY OF THE INVENTION

Problems to be Solved by the Invention

In recent years, the performance of vehicles has progressed, and like vehicles, tires are required to be further improved in braking performance and traction performance on dry road surfaces. Further, tires are required to be suppressed in uneven wear.

The present disclosure was made in view of the circumstances as described above, and a primary objective of the present disclosure is to provide a tire of which braking performance and traction performance on dry road surfaces can be improved while suppressing uneven wear.

Means for Solving the Problems

According to the present disclosure, a tire comprises:
a tread portion including a first land portion having a first edge and a second edge both extending in the tire circumferential direction, and a ground contacting top surface formed therebetween,
the first land portion provided with first lateral sipes extending in a tire axial direction, and
the first lateral sipes each having a first sipe wall and a second sipe wall which are respectively located on a first side and a second side in the tire circumferential direction,
wherein
each of the first lateral sipes opens at the ground contacting top surface of the first land portion via a chamfer portion,
the chamfer portion comprises a first sloped surface continued from the first sipe wall, and a second sloped surface continued from the second sipe wall, and
in a plan view of the first land portion, a width W1 of the first sloped surface is greater than a width W2 of the second sloped surface.

Effects of the Invention

Therefore, in the tire according to the present disclosure, by adopting the above configuration of the first lateral sipe, the braking performance and traction performance on dry road surfaces can be improved, while suppressing uneven wear.

DETAILED DESCRIPTION OF THE INVENTION

The present disclosure may be applied to various tires, e.g. pneumatic tires and non-pneumatic tires for various vehicles, e.g. passenger cars, heavy-duty vehicles such as trucks and busses, and the like. In particular, the present disclosure is suitably applied to a pneumatic tire for passenger cars.

Taking a pneumatic tire for passenger cars as an example, an embodiment of the present disclosure will be described in detail in conjunction with accompanying drawings.

Figure 1:
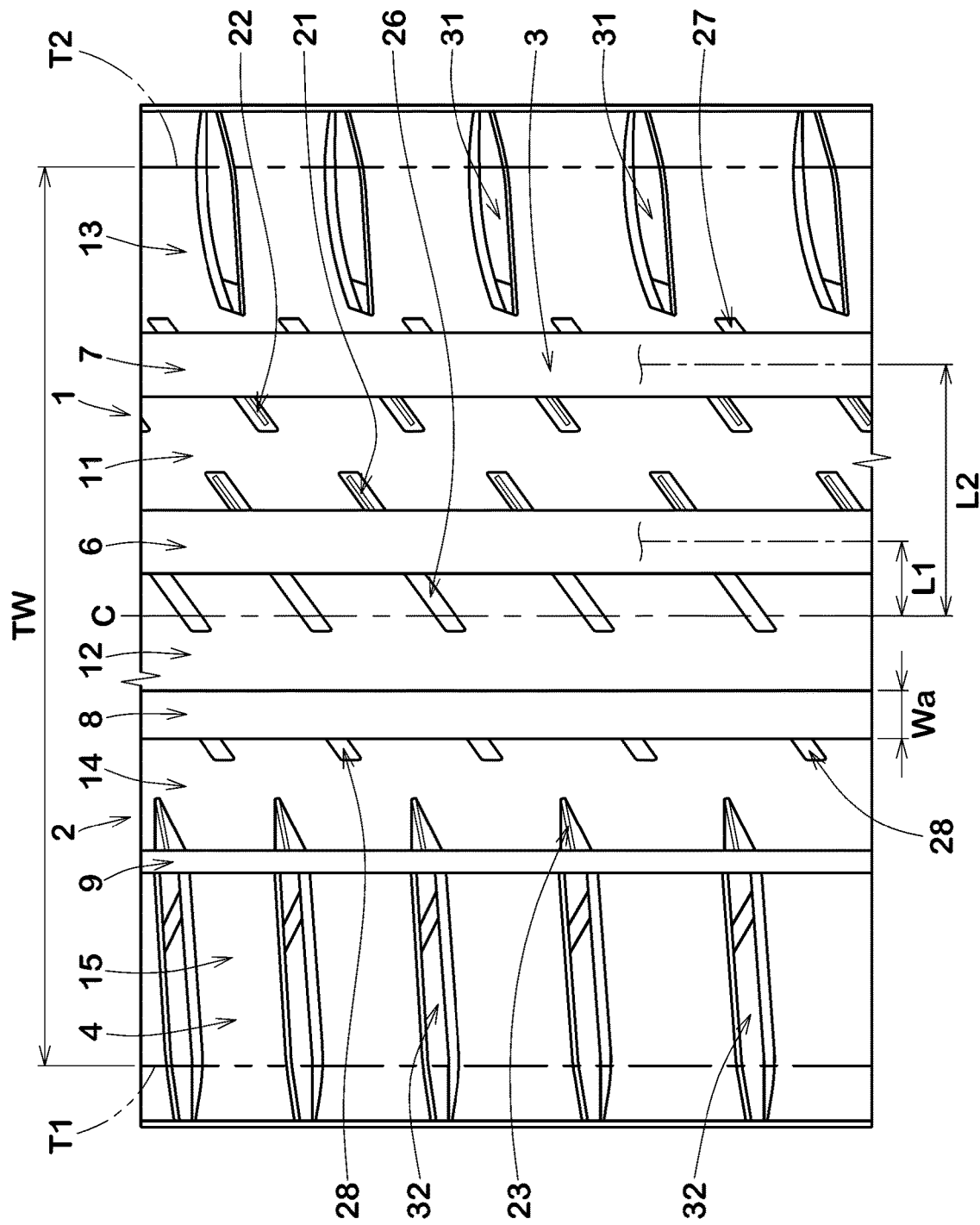
FIG. 1 is a developed partial view of a tread portion of a tire as an embodiment of the present disclosure.

FIG. 1 is a developed partial view of a tread portion 2 of a pneumatic tire 1 as an embodiment of the present disclosure.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In the present embodiment, the mounting direction of the tire 1 to a vehicle is specified. That is, the tread portion 2 has an outboard tread edge T1 to be positioned away from the center of the vehicle body, and an inboard tread edge T2 to be positioned close to the center of the vehicle body.

For example, a sidewall portion (not shown) of the tire to be located outboard when the tire installed on the vehicle is provided with an indication representing "outside", and a sidewall portion to be located inboard is provided with an indication representing "inside".

The tread edges T1 and T2 are the axial outermost edges of the ground contacting patch of the tire which occurs when the tire under its normal state is contacted with a flat horizontal surface at a camber angle of 0 degrees and loaded with the normal tire load for the tire.

When the tire 1 is a pneumatic tire for which various standards have been established, the normal state of the tire 1 is such that the tire 1 is mounted on a normal rim, and inflated to a normal pressure, but loaded with no tire load.

When the tire 1 is a pneumatic tire or non-pneumatic tire for which various standards are not yet established, the normal state of the tire 1 is such that the tire is put under a standard usage condition according to the purpose of use of the tire, but not yet attached to the vehicle and loaded with no tire load.

In this application including specification and claims, various dimensions, positions and the like of the tire refer to those under the normal state unless otherwise noted.

The above-mentioned normal rim is a wheel rim officially approved or recommended for the tire by the standardization organization on which the tire is based, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The above-mentioned normal pressure is the maximum air pressure officially approved or recommended for the tire by the standardization organization on which the tire is based, for example, the "maximum air pressure" in JATMA, the maximum pressure given in the "Tire Load Limits at Various Cold Inflation Pressures" table in TRA, and the "Inflation Pressure" in ETRTO.

When the tire 1 is a pneumatic tire for which various standards have been established, the normal tire load is the maximum tire load officially approved or recommended for the tire by the same standardization organization and specified in the Air-pressure/Maximum-load Table or similar list, for example, the "maximum air pressure" in JATMA, the "Inflation Pressure" in ETRTO, the maximum pressure given in the "Tire Load Limits at Various Cold Inflation Pressures" table in TRA or the like.

When the tire 1 is a pneumatic tire or non-pneumatic tire for which various standards are not yet established, the normal tire load is the maximum tire load recommended for the tire by the tire manufacturer.

The tread portion 2 is provided, between the outboard tread edge T1 and the inboard tread edge T2, with circumferential grooves 3 continuously extending in the tire circumferential direction, and thereby, the tread portion 2 is axially divided into annular land portions 4.

In this embodiment, the number of the circumferential grooves 3 is four, and the number of the land portions 4 is accordingly five.

The present disclosure is however, not limited thereto. For example, the tread portion 2 may be axially divided into four land portions 4 by three circumferential grooves 3.

In this embodiment, the circumferential grooves 3 include an axially inner first circumferential groove 6 and an axially outer second circumferential groove 7 which are disposed between the tire equator C and the inboard tread edge T2, and an axially inner third circumferential groove 8 and an axially outer fourth circumferential groove 9 which are disposed between the tire equator C and the outboard tread edge T1.

It is preferable that an axial distance L1 from the tire equator C to the widthwise centerline of the first circumferential groove 6 is 5% to 15% of the tread width TW, and an axial distance L1 from the tire equator C to the widthwise centerline of the third circumferential groove 8 is 5% to 15% of the tread width TW.

It is preferable that an axial distance L2 from the tire equator C to the widthwise centerline of the second circumferential groove 7 is 25% to 35% of the tread width TW, and an axial distance L2 from the tire equator C to the widthwise centerline of the fourth circumferential groove 9 is 25% to 35% of the tread width TW.

Here, the tread width TW is the distance in the tire axial direction between the outboard tread edge T1 and the inboard tread edge T2 measured under the normal state of the tire.

In the present embodiment, each of the circumferential grooves 3 is a straight groove parallel with the tire circumferential direction. However, the circumferential grooves 3 may be zigzag or wavy grooves alone or in combination with straight groove(s).

It is preferable that the groove width Wa of each of the circumferential grooves 3 is at least 3 mm. It is preferable that the groove width Wa is 2.0% to 8.0% of the tread width TW.

In the present embodiment, the groove width Wa of the fourth circumferential groove 9 is smallest among the circumferential grooves 3.

The present disclosure is however, not limited to such groove width arrangement.

In the present embodiment, the land portions 4 are:
a first land portion 11 between the first and second circumferential grooves 6 and 7; a second land portion 12 between the first and third circumferential grooves 6 and 8; a third land portion 13 axially outward of the second circumferential groove 7; a fourth land portion 14 between the third and fourth circumferential grooves 8 and 9; and a fifth land portion 15 axially outward of the fourth circumferential groove 9.

In this embodiment, the second land portion 12 includes the tire equator C within the width; the third land portion 13 includes the inboard tread edge T2; and the fifth land portion 15 includes the outboard tread edge T1.

Figure 2:
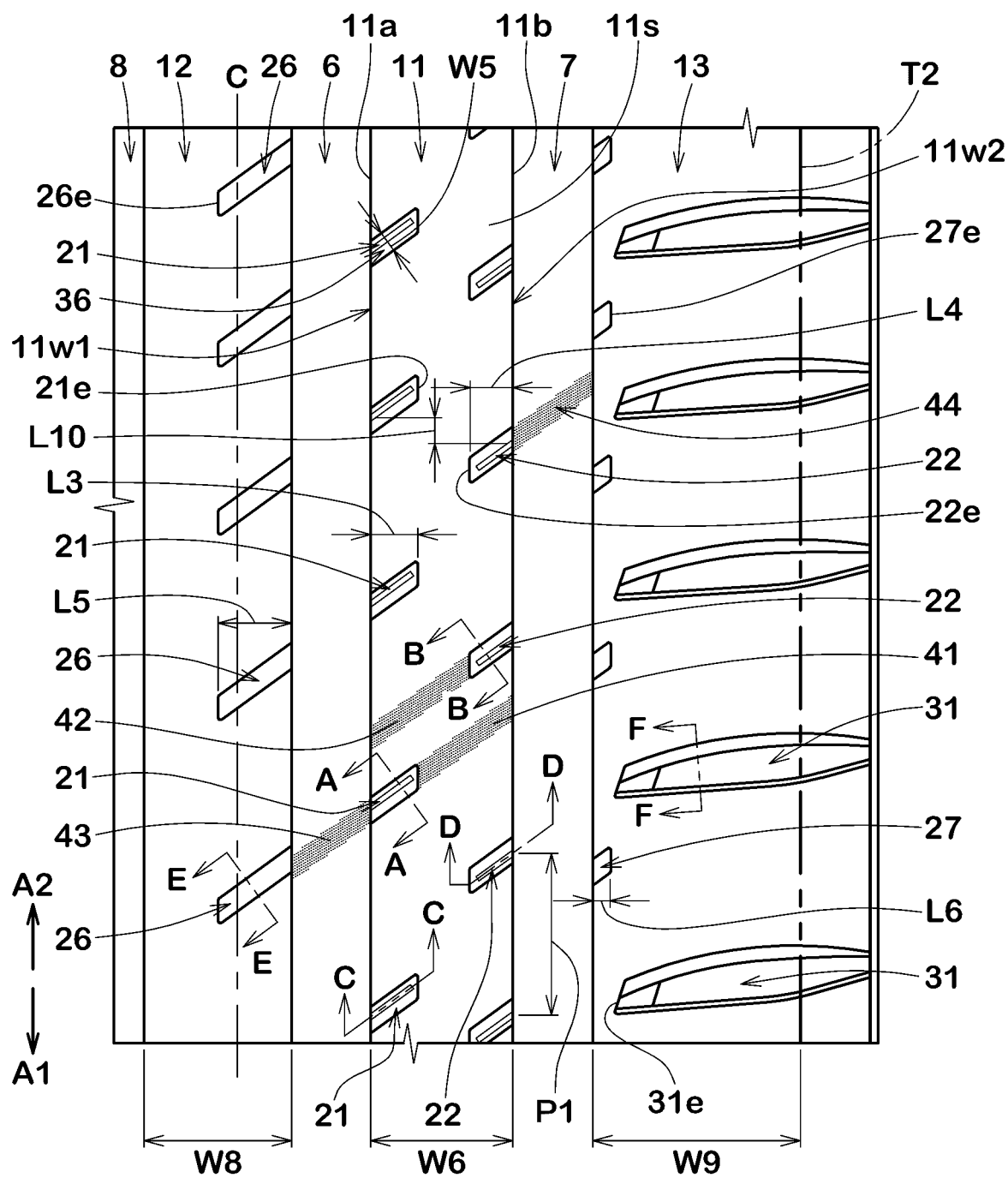
FIG. 2 is an enlarged view showing a first land portion, a second land portion and a third land portion shown in FIG. 1.

As shown in FIG. 2, the first land portion 11 has
an axially inner edge 11a and an axially outer edge 11b which extend in the tire circumferential direction,
a ground contacting top surface 11s extending therebetween,
an axially inner side wall 11w1 extending radially inwardly from the axially inner edge 11a, and
an axially outer side wall 11w2 extending radially inwardly from the axially outer edge 11b.

The first land portion 11 is provided with first lateral sipes 21 extending in the tire axial direction. In the present embodiment, the first land portion 11 is further provided with second lateral sipes 22 extending in the tire axial direction.

Figure 3:
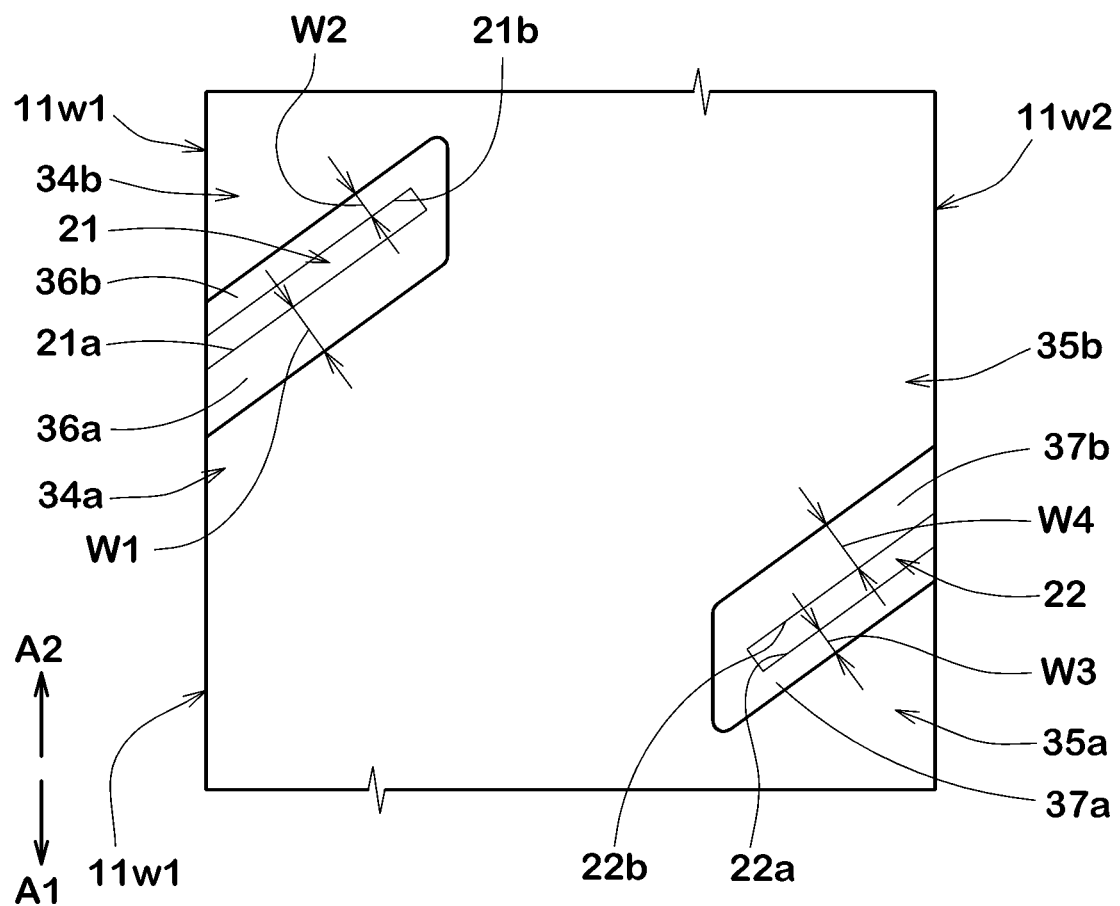
FIG. 3 is an enlarged view showing first lateral sipes and second lateral sipes shown in FIG. 2.

FIG. 3 shows an enlarged top view of the first lateral sipe 21, and an enlarged top view of the second lateral sipe 22.

Figure 4:
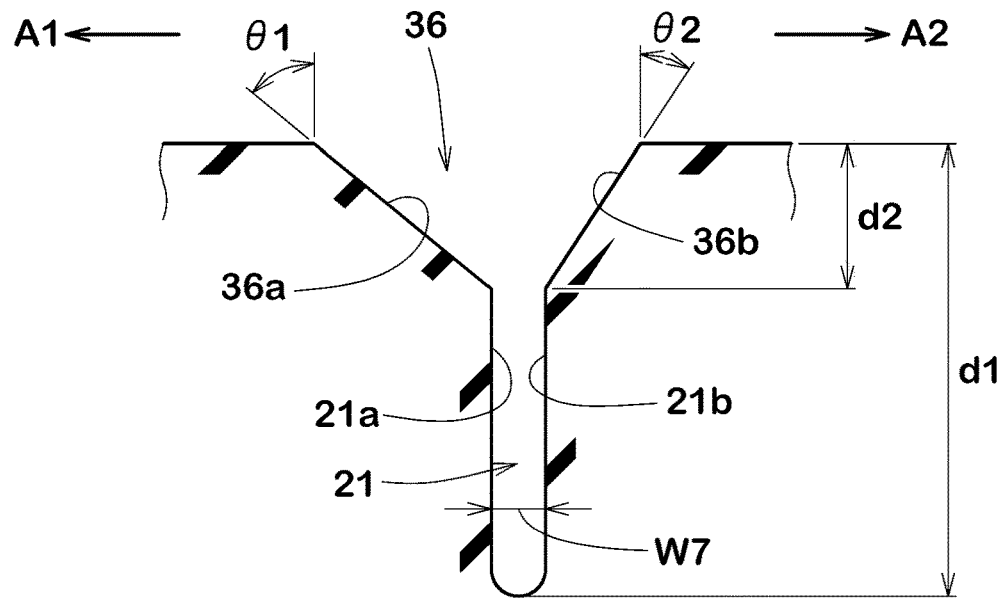
FIG. 4 is a cross-sectional view taken along line A-A of FIG. 2.

FIG. 4 is an enlarged cross sectional view of the first lateral sipe 21 taken along line A-A of FIG. 2.

Figure 5:
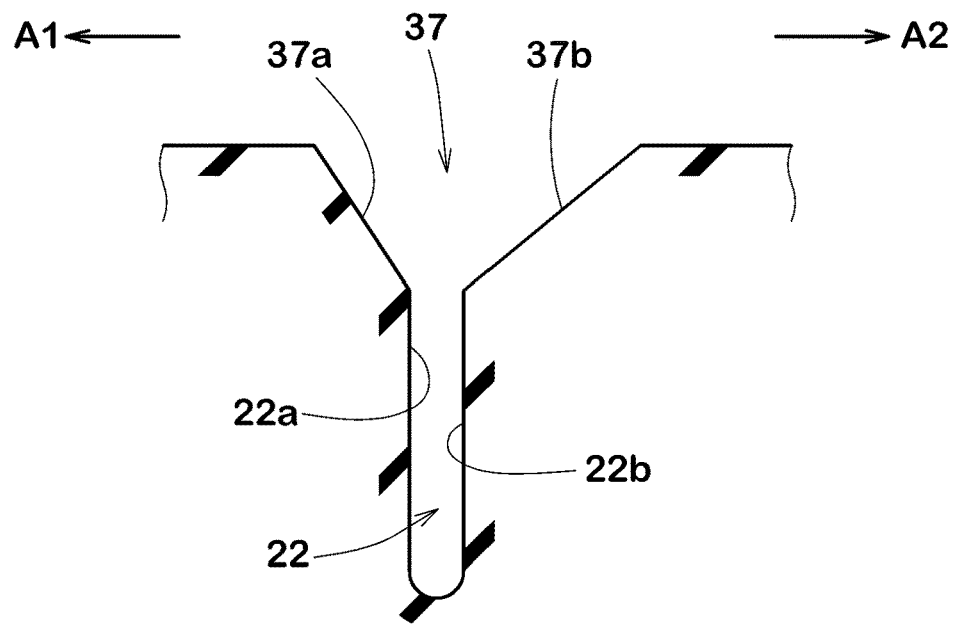
FIG. 5 is a cross-sectional view taken along line B-B of FIG. 2.

FIG. 5 is an enlarged cross sectional view of the second lateral sipe 22 taken along line B-B in FIG. 2.

As shown in FIG. 4, each of the first lateral sipes 21 has a first sipe wall 21a positioned on a first side A1 in the tire circumferential direction, and a second sipe wall 21b positioned on a second side A2 in the tire circumferential direction.

Here, the term "sipe" means a narrow groove having a width OF not more than 1.5 mm between two opposite side walls (in the case of FIG. 4, first sipe wall 21a and second sipe wall 21b), inclusive of a cut having no substantial width.

The sipe may be opened at the ground contacting top surface of the land portion via a chamfer portion as described later. Further, the sipe may include a bottom portion having an increased width formed radially inside the two opposite side walls.

As shown in FIG. 4, each of the first lateral sipes 21 opens at the ground contacting top surface 11s of the first land portion 11 via a chamfer portion 36.

The chamfer portion 36 is formed by
a first sloped surface 36a extending from the ground contacting top surface 11s to the first sipe wall 21a, and
a second sloped surface 36b extending from the ground contacting top surface 11s to the second sipe wall 21b.

In the present embodiment, the first sloped surface 36a and the second sloped surface 36b are planar. However, each of the first sloped surface 36a and the second sloped surface 36b may be a convexly curved surface.

As shown in FIG. 3, the width W1 of the first sloped surface 36a is larger than the width W2 of the second sloped surface 36b, when measured perpendicularly to the longitudinal direction of the first lateral sipe 21 in its top view.

Thereby, the tire 1 according to the present disclosure can be improved in braking performance and traction performance on dry road surfaces (hereinafter, these performances are comprehensively referred to as "dry performance"), while suppressing uneven wear as explained below.

Since both edges of the first lateral sipe 21 are chamfered by the first sloped surface 36a and the second sloped surface 36b of the chamfer portion 36, uneven wear around the first lateral sipes 21 can be effectively suppressed.

Further, since the width W1 of the first sloped surface 36a is larger than the width W2 of the second sloped surface 36b, the first sloped surface 36a can easily contact with the ground during acceleration or deceleration of the vehicle, and a large grip force can be exhibited, while suppressing a decrease in rubber volume due to the chamfering.

Thereby, in the present disclosure, an improvement in traction performance or braking performance on dry road surfaces can be obtained, while suppressing uneven wear.

As shown in FIG. 4, the total depth d1 of the first lateral sipe 21 including the chamfer portion 36 is, for example, set in a range from 70% to 90% of the depth of the circumferential groove 3. Preferably, the total depth d1 is in a range from 2.0 to 2.5 times the depth d2 of the chamfer portion 37.

The total depth d1 is the depth from the ground contacting top surface to the bottom of the sipe. Hereinafter, unless otherwise specified, the depth of the sipe means the total depth including the chamfer portion.

The depth d2 of the chamfer portion 37 is 2.0 mm or less, preferably 1.0 to 2.0 mm.

The opening width W5 (shown in FIG. 2) of the chamfer portion 36 is, for example, in a range from 2.5 to 4.5 mm.

The first lateral sipe 21 is however, not limited to such configuration.

As shown in FIG. 2, the first lateral sipes 21 in this embodiment are inclined at an angle in a range from 30 to 40 degrees with respect to the tire axial direction. Between the first sipe wall 21a to which the first sloped surface 36a having the larger width W1 is connected, and the axially inner side wall 11w1 of the first land portion 11, there is formed an obtuse angled corner 34a in the top view of the first land portion 11 as shown in FIG. 3.

Between the second sipe wall 21b to which the second sloped surface 36b having the smaller width W2 is connected, and the axially inner side wall 11w1 of the first land portion 11, there is formed an acute angled corner 34b in the top view of the first land portion 11 as shown in FIG. 3.

Preferably, the first lateral sipes 21 each extend from the axially inner edge 11a and end within the ground contacting top surface 1 is of the first land portion 11 to have a closed end 21e as shown in FIG. 2.

The first lateral sipes 21 in this embodiment end on the axially inside of the center position in the tire axial direction of the first land portion 11.

The axial length L3 of each first lateral sipe 21 is, for example, set in a range from 25% to 40% of the axial width W6 of the ground contacting top surface 11 is of the first land portion 11.

Such first lateral sipes 21 can improve the dry performance while suppressing uneven wear.

As shown in FIG. 3, the width W1 of the first sloped surface 36a is constant over a range of not less than 70% of the first sipe wall 21a in the longitudinal direction of the sipe. Also, the width W2 of the second sloped surface 36b is constant over a range of not less than 70% of the second sipe wall 21b in the longitudinal direction of the sipe.

Preferably, each of the width W1 and the width W2 is substantially constant over the entire range of the first lateral sipe 21 in the longitudinal direction.

As a result, the above-described effects can be reliably exhibited.

Preferably, the width W1 of the first sloped surface 36a is in a range from 2.0 to 5.0 times, more preferably, 3.0 to 4.0 times the width W7 (shown in FIG. 4) between the first sipe wall 21a and the second sipe wall 21b.

For example, the width W7 is set in a range from 0.2 to 1.0 mm.

Such first sloped surface 36a can enhance the dry performance and uneven wear resistance in a well-balanced manner.

From a similar point of view, the angle θ1 of the first sloped surface 36a is, for example, set in a range from 40 to 60 degrees with respect to a normal line to the ground contacting top surface in the cross sectional view of the sipe 21 perpendicular to the longitudinal direction of the sipe 21 as shown in FIG. 4.

As shown in FIG. 3, the width W1 of the first sloped surface 36a is preferably not less than 1.5 times, more preferably not less than 1.8 times, but preferably not more than 3.5 times, more preferably not more than 3.2 times the width W2 of the second sloped surface 36b. As a result, the dry performance and uneven wear resistance are improved in a well-balanced manner.

From a similar point of view, the angle θ2 of the second sloped surface 36b is, for example, set in a range from 20 to 40 degrees with respect to a normal line to the ground contacting top surface in the cross sectional view of the sipe 21 perpendicular to the longitudinal direction of the sipe 21 as shown in FIG. 4.

Preferably, the difference between the angle θ1 and the angle θ2 is not more than 25 degrees.

In the present embodiment, as shown in FIG. 2, the first land portion 11 is provided with second lateral sipes 22 extending in the tire axial direction.

In this embodiment, the second lateral sipes 22 are inclined in the same direction as the first lateral sipes 21 with respect to the tire axial direction, and further, the inclination angle is also the same as the first lateral sipes 21.

Between the second sipe wall 22b to which the second sloped surface 37b having a larger width W4 is connected, and the axially outer side wall 11w2 of the first land portion 11, there is formed an obtuse angled corner 35b in the top view of the first land portion 11.

Between the first sipe wall 22a to which the first sloped surface 37a having a smaller width W3 is connected, and the axially outer side wall 11w2 of the first land portion 11, there is formed an acute angled corner 35a in the top view of the first land portion 11.

In this embodiment, as shown in FIG. 2, the second lateral sipes 22 each extend from the axially outer edge 11b and end within the ground contacting top surface 1 is of the first land portion 11 to have a closed end 22e.

The axial length L4 of each second lateral sipe 22 in this embodiment is set in a range from 25% to 40% of the axial width W6 of the ground contacting top surface 11s of the first land portion 11.

As another example, the axial length L4 of the second lateral sipe 22 may be smaller than the axial length L3 of the first lateral sipe 21.

In this case, the axial length L3 is, for example, not more than 130%, preferably in a range from 110% to 120% of the axial length L4.

Thereby, uneven wear of the first land portion 11 in an axially inner edge 11a side portion may be suppressed.

As shown in FIG. 5, each of the second lateral sipes 22 has a first sipe wall 22a positioned on the first side A1 in the tire circumferential direction, and a second sipe wall 22b positioned on the second side A2 in the tire circumferential direction. Each of the second lateral sipes 22 opens at the ground contacting top surface 11s of the first land portion 11 via a chamfer portion 37.

The chamfer portion 37 is, as shown in FIG. 5, formed by a first sloped surface 37a extending from the first sipe wall 22a to the ground contacting top surface 11s, and a second sloped surface 37b extending from the second sipe wall 22b to the ground contacting top surface 11s.

As shown in FIG. 3, the width W3 of the first sloped surface 37a is smaller than the width W4 of the second sloped surface 37b when measured perpendicularly to the longitudinal direction of the second lateral sipe 22 in the top view of the first land portion 11.

In the second lateral sipe 22, the width of the sloped surface located on the second side A2 is larger. That is, the size relationship of the sloped surface is opposite to that of the first lateral sipe 21.

With such first lateral sipes 21 and second lateral sipes 22, the tire 1 of the present embodiment can improve both traction performance and braking performance on dry road surfaces. That is, in the case where the first sloped surface 36a of the first lateral sipe 21 exhibits a large gripping force during traction, the second sloped surface 37b of the second lateral sipe 22 may exhibit a large gripping force during braking.

When the direction of rotation of the tire is reversed, the first lateral sipe 21 and the second lateral sipe 22 alternate their functions, and the above effects may be exhibited.

The width W3 of the first sloped surface 37a of the chamfer portion 37 of the second lateral sipe 22 is constant over a range of 70% or more of the first sipe wall 22a in the longitudinal direction of the sipe.

The width W4 of the second sloped surface 37b of the chamfer portion 37 of the second lateral sipe 22 is constant over a range of 70% or more of the second sipe wall 22b in the longitudinal direction of the sipe.

Preferably, the width W3 and the width W4 are each substantially constant over the entire length of the second lateral sipe 22. Thereby, the above-described effects can be reliably exhibited.

The above-described configuration of the second sloped surface 36b of the first lateral sipe 21 is applied to the first sloped surface 37a of the second lateral sipe 22. Also, the above-described configuration of the first sloped surface 36a of the first lateral sipe 21 is applied to the second sloped surface 37b of the second lateral sipe 22. Therefore, detailed descriptions of both sloped surfaces of the second lateral sipe 22 are omitted.

Figure 6:
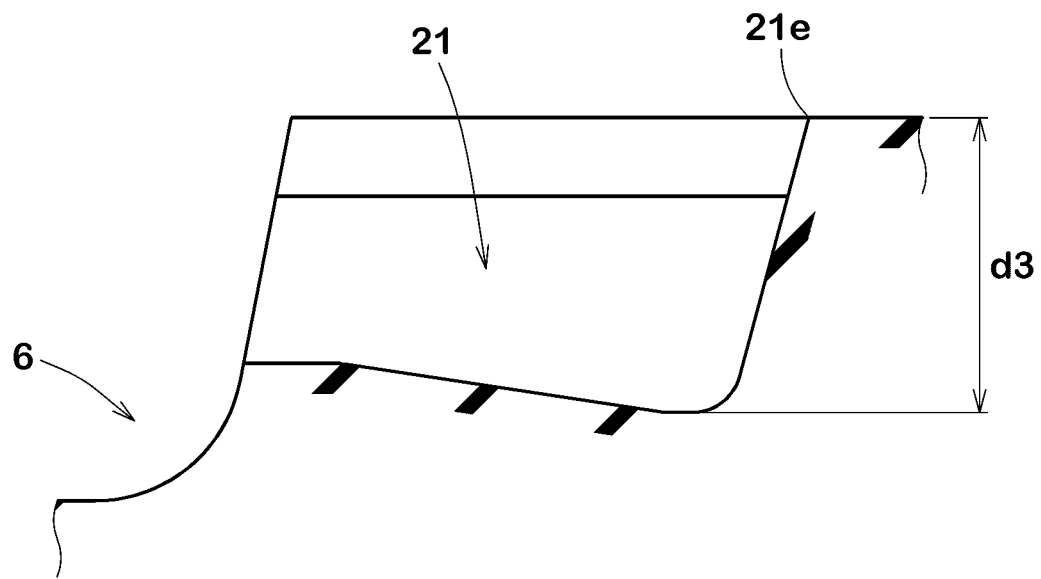
FIG. 6 is a cross-sectional view taken along line C-C of FIG. 2.

FIG. 6 is a cross-sectional view taken along line C-C in FIG. 2 to show the cross section of the first lateral sipe 21 along its length direction.

Figure 7:
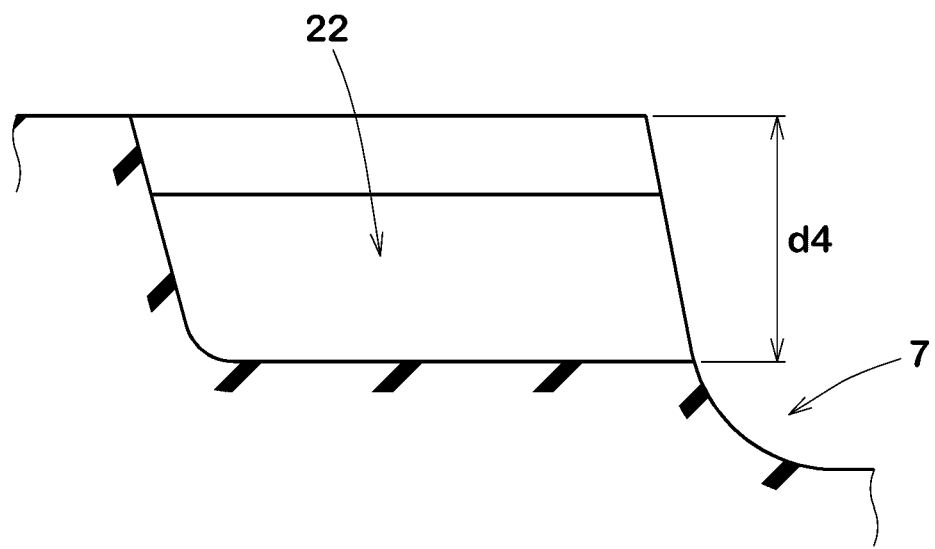
FIG. 7 is a cross-sectional view taken along line D-D of FIG. 2.

FIG. 7 is a cross-sectional view taken along line D-D in FIG. 2 to show the cross section of the second lateral sipe 22 along its length direction.

As shown in FIG. 6, the depth of the first lateral sipe 21 increases toward the closed end 21e to have a maximum depth d4.

As shown in FIG. 7, the depth d3 of the second lateral sipe 22 is substantially constant along its longitudinal direction.

Preferably, the maximum depth d4 is smaller than the depth d3, for example, set in a range from 70% to 90% of the depth d3.

Such first lateral sipes 21 and second lateral sipes 22 help to improve the dry performance and wet performance in a well-balanced manner.

Preferably, the first lateral sipes 21 are shifted from the second lateral sipes 22 in the tire circumferential direction as shown in FIG. 2.

Preferably, in the top view of the first land portion 11 as shown in FIG. 2, a virtual zone 41 (indicated by a fine dot pattern in FIG. 2) extended from each of the first lateral sipes 21 in the longitudinal direction thereof with the same width as the first lateral sipe 21, overlaps with none of the second lateral sipes 22.

Similarly, it is preferable that a virtual zone 42 (indicated by a fine dot pattern in FIG. 2) extended from each of the second lateral sipes 22 in the longitudinal direction thereof with the same width as the second lateral sipe 22, overlaps with none of the first lateral sipes 21.

Such sipe arrangement helps to further improve the uneven wear resistance

In the present embodiment, the second lateral sipes 22 are arranged at the same pitches in the tire circumferential direction as the first lateral sipes 21.

In the present embodiment, each of the second lateral sipes 22 is positioned closely to one of the first lateral sipes 21 adjacent thereto on the second side A2 in the tire circumferential direction than one of the first lateral sipes 21 adjacent thereto on the first side A1 in the tire circumferential direction.

As a result, the first sloped surface 36a of the first lateral sipe 21 and the second sloped surface 37b of the second lateral sipe 22 come closer to each other, thereby further improving the uneven wear resistance.

In the present embodiment, the minimum distance L10 in the tire circumferential direction between the end of the first lateral sipe 21 at the axially inner edge 11a and the end of the second lateral sipe 22 at the axially outer edge 11b is preferably not more than 30%, more preferably not more than 25%, but preferably not less than 15% of one pitch length P1 in the tire circumferential direction of the first lateral sipes 21 or the second lateral sipes 22.

It is preferable that the first land portion 11 in the present embodiment is provided with no grooves or sipes except for the first lateral sipes 21 and the second lateral sipes 22, so the first land portion 11 is continuous in the tire circumferential direction. Such first land portion 11 can further improve the dry performance.

The second land portion 12 is provided with first shallow grooves 26.

The first shallow grooves 26 in this example each extend from the first circumferential groove 6 and end to have a closed end 26e within the ground contacting top surface of the second land portion 12.

The first shallow grooves 26 are inclined with respect to the tire axial direction in the same direction as the first lateral sipes 21 and the second lateral sipes 22.

The angles of the first shallow grooves 26 with respect to the tire axial direction are, for example, set in a range from 30 to 40 degrees.

The axial length L5 of each of the first shallow grooves 26 is, for example, set in a range from 40% to 60% of the axial width W8 of the ground contacting top surface of the second land portion 12. Preferably, the axial length L5 is greater than the axial length L3 of the first lateral sipes 21.

Such first shallow grooves 26 help to improve the uneven wear resistance and wet performance.

Figure 8:
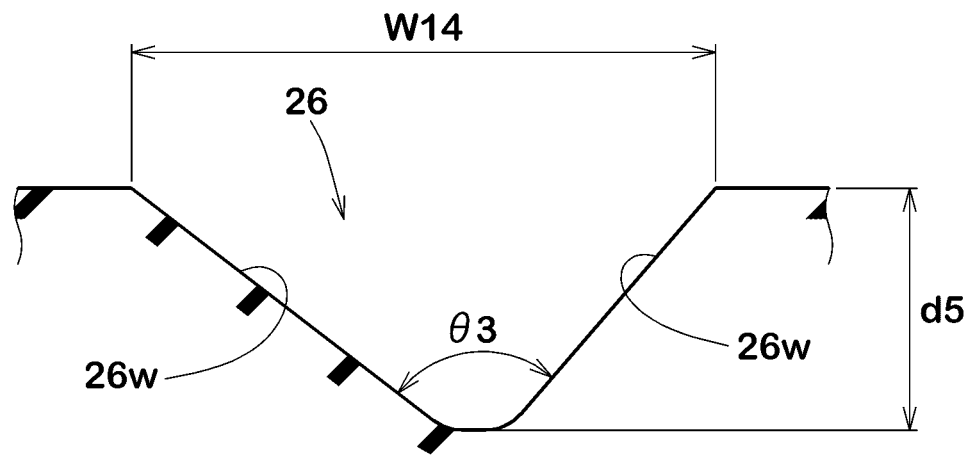
FIG. 8 is a cross-sectional view taken along line E-E of FIG. 2.

FIG. 8 is a cross-sectional view taken along line E-E in FIG. 2 to show a cross section of the first shallow groove 26 perpendicular to the longitudinal direction thereof.

The depth d5 of the first shallow groove 26 is, for example, set in a range from 0.5 to 1.5 mm. The groove width W14 of the first shallow groove 26 is, for example, set in a range from 1.5 to 2.5 mm.

Preferably, the first shallow groove 26 has two groove walls 26w inclined relatively largely to have a V-shaped cross-sectional shape as shown in FIG. 8.

The angle θ3 between the two groove walls 26w in the cross section of the first shallow groove 26 is, for example, set in a range from 80 to 100 degrees.

For example, when the second land portion is deformed due to the increased ground contact pressure during cornering, the groove walls 26w of such first shallow grooves 26 contact with the road surface, and the dry performance and wet performance are improved.

As shown in FIG. 2, a virtual zone 43 (indicated by a fine dot pattern in FIG. 2) extended from each of the first shallow grooves 26 in the longitudinal direction thereof with the same width as the first shallow groove 26, preferably overlaps with one of the first lateral sipes 21 in the plan view of the tread portion. Such first shallow grooves 26 can further improve the dry performance and wet performance.

The third land portion 13 is provided with second shallow grooves 27.

The second shallow grooves 27 in the present embodiment each extend from the second circumferential groove 7 and end to have a closed end 27e within the ground contacting top surface of the third land portion 13.

The axial length L6 of each second shallow groove 27 is set in a range from 5% to 15% of the axial width W9 of the ground contacting top surface of the third land portion 13.

Preferably, the axial length L6 is less than the axial length L4 of the second lateral sipes 22.

Such second shallow grooves 27 can improve the dry performance while suppressing uneven wear of the third land portion 13.

The configuration of the first shallow groove 26 with respect to of the cross section described above with reference to FIG. 8, is applied to the cross section of the second shallow groove 27. Therefore, description of the cross section of the second shallow groove 27 is omitted.

It is preferable that the second shallow grooves 27 are sifted from the second lateral sipes 22 in the tire circumferential direction as shown in FIG. 2.

It is preferable that a virtual zone 44 (indicated by a fine dot pattern in FIG. 2) extended from each of the second lateral sipes 22 in the longitudinal direction thereof with the same width as the second lateral sipe 22, overlaps with none of the second shallow grooves 27 in the plan view of the tread portion as shown in FIG. 2. Thereby, the uneven wear resistance may be further improved.

In the present embodiment, the third land portion 13 is further provided with first lateral grooves 31.

The first lateral groove 31 in this embodiment extends across the inboard tread edge T2 and has a closed end 31e within the ground contacting top surface of the third land portion 13. Such first lateral grooves 31 can improve the uneven wear resistance and wet performance.

Figure 9:
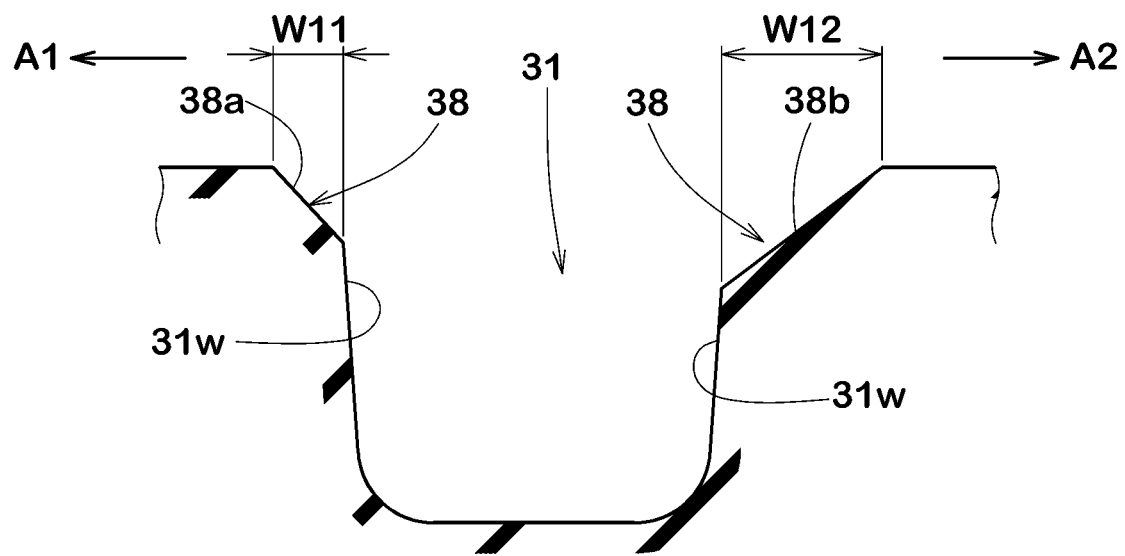
FIG. 9 is a cross-sectional view taken along line F-F of FIG. 2.

FIG. 9 is a cross-sectional view taken along line F-F of FIG. 2.

As shown, the first lateral groove 31 is provided with a chamfer portion 38.

The chamfer portion 38 comprises a small sloped surface 38a extending between one of the groove walls 31w of the first lateral groove 31 and the ground contacting top surface of the third land portion 13, and a large sloped surface 38b extending between the other of the groove walls 31w of the first lateral groove 31 and the ground contacting top surface of the third land portion 13.

The large sloped surface 38b has a chamfer width W12, and the small sloped surface 38a has a chamfer width W11 smaller than the chamfer width W12.

For example, the chamfer width W11 is set in a range from 40% to 60% of the chamfer width W12.

The small sloped surface 38a is positioned on the first side A1 in the tire circumferential direction with respect to the large sloped surface 38b.

By arranging the sloped surfaces in this way, the traction performance and braking performance on dry road surfaces can be improved in a well-balanced manner.

Figure 10:
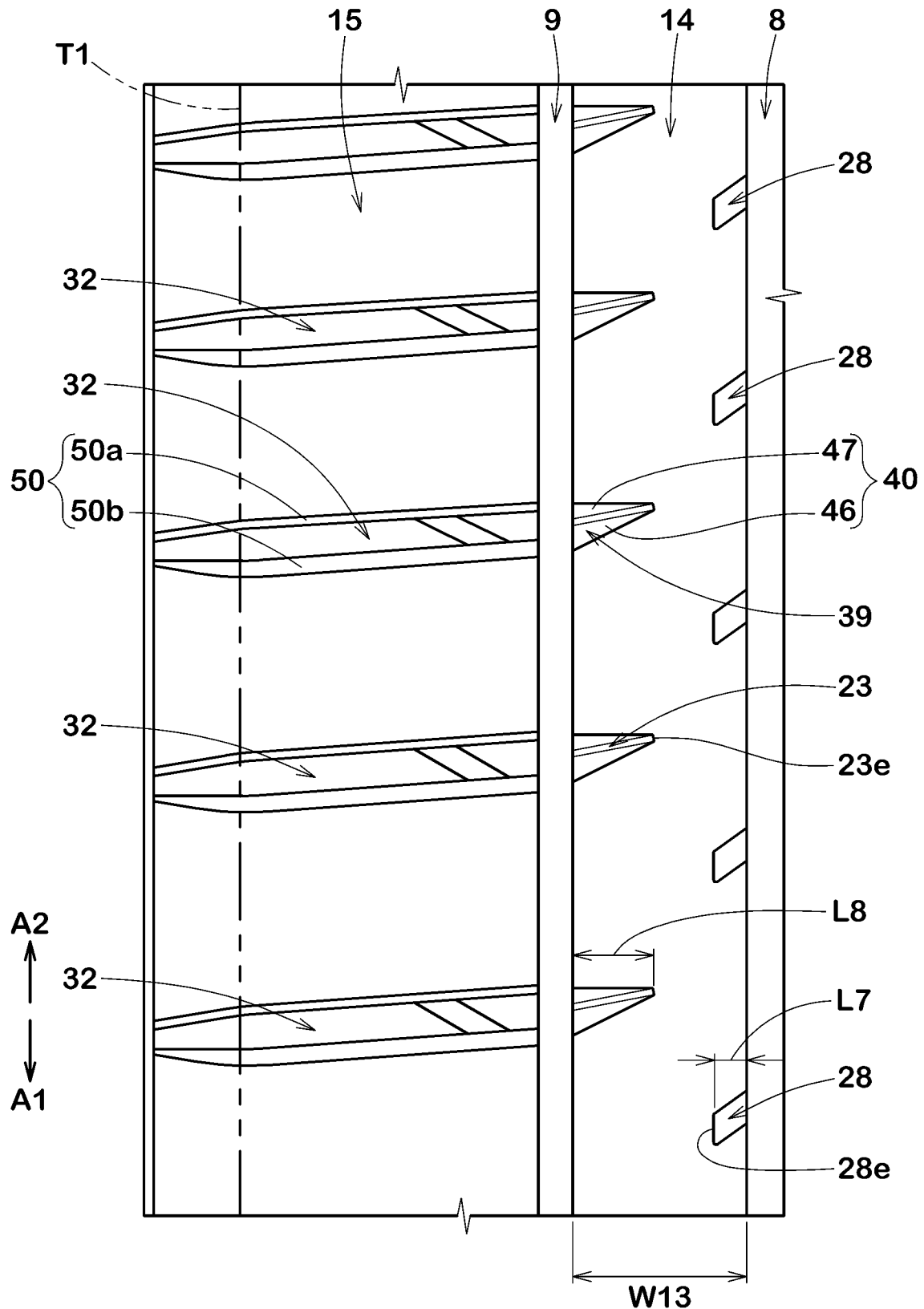
FIG. 10 is an enlarged view showing a fourth land portion and a fifth land portion shown in FIG. 1.

FIG. 10 shows a partial top view of the fourth land portion 14 and that of the fifth land portion 15.

As shown, the fourth land portion 14 is provided with third shallow grooves 28 and third lateral sipes 23.

Each of the third shallow grooves 28 in the present embodiment extends from the third circumferential groove 8 and ends to have a closed end 28e within the ground contacting top surface of the fourth land portion 14.

The axial length L7 of each third shallow groove 28 is, for example, set in a range from 15% to 25% of the axial width W13 of the ground contacting top surface of the fourth land portion 14. Preferably, the axial length L7 is smaller than the axial length L3 of the first lateral sipes 21.

Such third shallow grooves 28 can improve the dry performance and wet performance while suppressing uneven wear of the fourth land portion 14.

The configuration of the cross section of the first shallow groove 26 described above with reference to FIG. 8 is applied to the cross section of the third shallow groove 28. This, redundant descriptions of the cross section of the third shallow groove 28 are omitted.

Each of the third lateral sipes 23 in this embodiment extends from the fourth circumferential groove 9 and ends to have a closed end 23e within the ground contacting top surface of the fourth land portion 14.

The axial length L8 of each third lateral sipe 23 is set in a range from 40% to 60% of the axial width W13 of the ground contacting top surface of the fourth land portion 14. Preferably, the axial length L8 is greater than the axial length L3 (shown in FIG. 2) of the first lateral sipe 21.

Such third lateral sipes 23 help to improve the dry performance and wet performance in a well-balanced manner.

The third lateral sipe 23 opens at the ground contacting top surface via a chamfer portion 39.

The chamfer portion 39 of the third lateral sipe 23 comprises two sloped surfaces 40 extending between the respective sipe walls and the ground contacting top surface of the fourth land portion 14.

As shown in FIG. 10, in the top view of the fourth land portion 14, the width of each of the sloped surfaces 40 (46 and 47) measured perpendicularly to the longitudinal direction of the third lateral sipe 23, is continuously increases toward the fourth circumferential groove 9.

The third lateral sipe 23 having such sloped surfaces 40 can effectively guide a water film existing between the fourth land portion 14 and a wet road surface, toward the fourth circumferential groove 9, and helps to improve the wet performance.

Preferably, the area of one 46 of the two sloped surfaces 40 is larger than the area of the other 47 of the two sloped surfaces 40. The sloped surface 46 with the lager area is positioned on the first side A1 in the tire circumferential direction with respect to the sloped surface 47 with the smaller area.

Such arrangement of the sloped surfaces 40 of the third lateral sipes 23 can improve the braking performance and the traction performance on dry road surfaces in a well-balanced manner in cooperation with the first lateral sipes 21 and second lateral sipes 22.

The fifth land portion 15 is provided with second lateral grooves 32.

Comparison Tests

Based on the tread pattern shown in FIG. 1, pneumatic tires of size 235/35ZR19 (rim size 19×8.0J) were experimentally manufactured as test tires (working examples Ex.1-Ex.9 and comparative example Ref).

Figure 11:
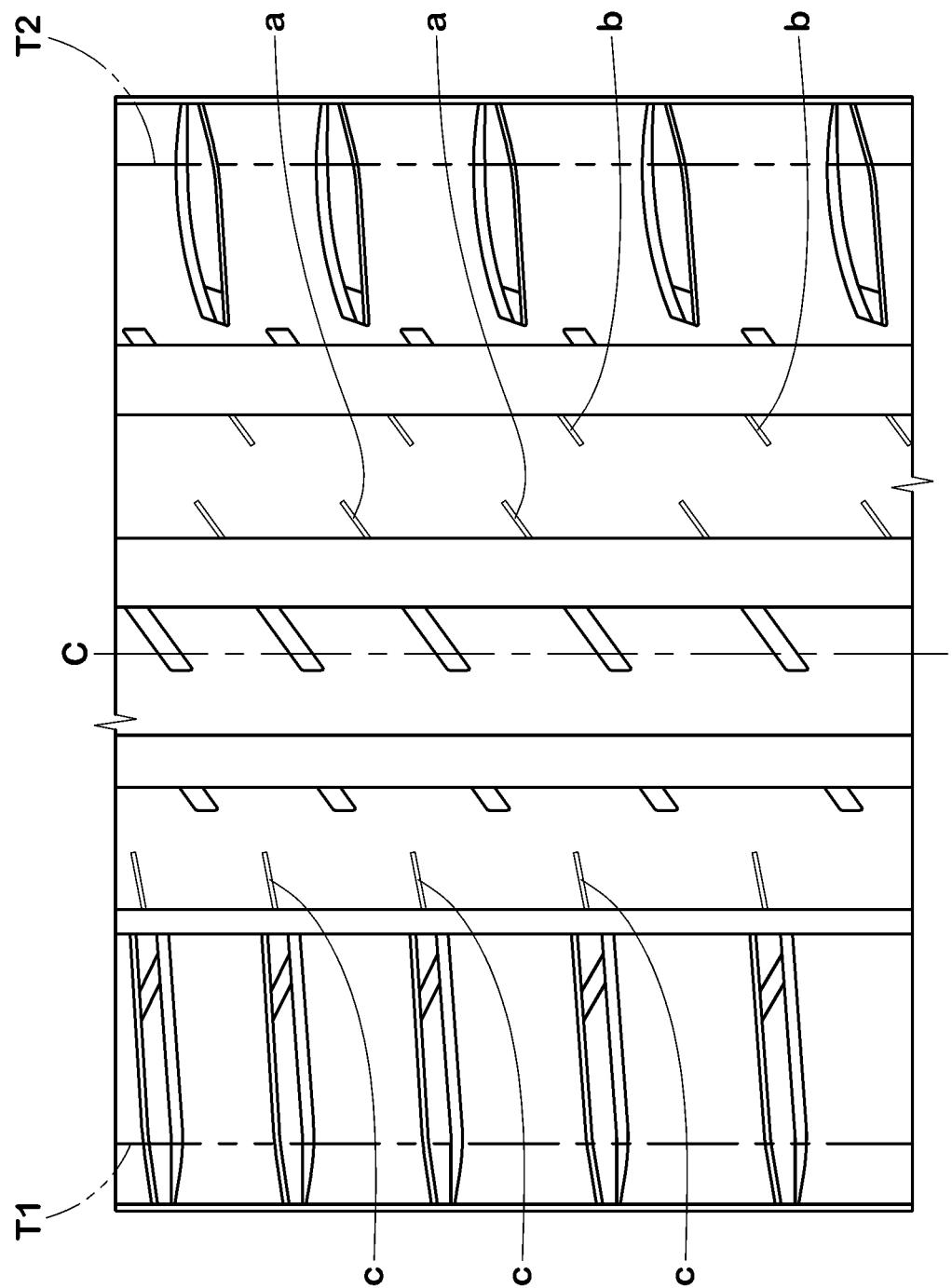
FIG. 11 is a developed partial view of a tread portion of a comparative example.

In the comparative example, first lateral sipes (a), second lateral sipes (b) and third lateral sipes (c) were not provided with chamfer portions as shown in FIG. 11. Except for this, the comparative example was substantially the same as the working examples.

The test tires were tested for the braking performance and traction performance on dry road surfaces as well as uneven wear resistance as follows, using a test car (2000 cc, 4WD passenger car) in which the test tires were mounted on the four wheels and inflated to 260 kPa.

<Uneven Wear Resistance>

After running the test car for a certain distance, the remaining height of the worn first land portion was measured around the first lateral sipes.

The results are indicated in Table 1 by an index based on comparative example being 100, wherein the larger the numerical value, the better the uneven wear resistance.

<Braking and Traction Performance on Dry Road Surface>

Braking and traction performance when the test car was run on a dry road surface were evaluated by the test driver.

The results are indicated in Table 1 by an index based on comparative example being 100, wherein the larger the numerical value, the better the braking and traction performance.

TABLE 1

| tire | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| tread pattern (FIG. No.) | 11 | 1 | 1 | 1 | 1 | 1 | 1 | 1 | 1 | 1 |
| width W1(mm) | — | 2.0 | 1.5 | 1.8 | 2.2 | 2.5 | 2.8 | 3.0 | 3.2 | 3.5 |
| width W2(mm) | — | 1.0 | 1.0 | 1.0 | 1.0 | 1.0 | 1.0 | 1.0 | 1.0 | 1.0 |
| width W3(mm) | — | 1.0 | 1.0 | 1.0 | 1.0 | 1.0 | 1.0 | 1.0 | 1.0 | 1.0 |
| width W4(mm) | — | 2.0 | 1.5 | 1.8 | 2.2 | 2.5 | 2.8 | 3.0 | 3.2 | 3.5 |
| braking performance | 100 | 108 | 105 | 107 | 108 | 108 | 108 | 109 | 110 | 110 |
| traction performance | 100 | 108 | 106 | 108 | 108 | 108 | 109 | 109 | 110 | 111 |
| uneven wear resistance | 100 | 106 | 104 | 105 | 106 | 106 | 106 | 106 | 105 | 104 |

The second lateral grooves 32 in this embodiment extend axially outwardly from the fourth circumferential groove 9 beyond the outboard tread edge T1.

Such second lateral grooves 32 can improve the wet performance.

The configuration of the cross section of the first lateral groove 31 described above with reference to FIG. 9 is applied to the cross section of the second lateral groove 32. Namely, the second lateral groove 32 has a cross section similar to that shown in FIG. 9, and the second lateral groove 32 has a chamfer portion 50 comprising a small sloped surface 50a and a large sloped surface 50b positioned on the first side A1 of the small sloped surface 50a.

Accordingly, the positional relationship between the small sloped surface 50a and the large sloped surface 50b of the second lateral groove 32 is reverse of the positional relationship between the small sloped surface 38a and the large sloped surface 38b of the first lateral groove 31.

As a result, the traction performance and the braking performance on dry road surfaces are improved in a well-balanced manner.

While detailed description has been made of a preferable embodiment of the present invention, the present invention can be embodied in various forms without being limited to the illustrated embodiment.

As shown in Table 1, it can be understood that each of the working examples exhibited excellent uneven wear resistance.

Further, It could be confirmed that the working examples were improved in both braking performance and traction performance on dry road surfaces, owing to the first lateral sipes and the second lateral sipes between which the positional relationship of the small sloped surface and the large sloped surface was reversed.

Statement of the Present Disclosure

The present disclosure is as follows.

Disclosure 1: A tire comprising
a tread portion including a first land portion having a first edge and a second edge which extend in a tire circumferential direction, and a ground contacting top surface formed therebetween,
the first land portion provided with first lateral sipes extending in a tire axial direction,
the first lateral sipes each having
a first sipe wall positioned on a first side in the tire circumferential direction and
a second sipe wall positioned on a second side in the tire circumferential direction, the first lateral sipes each opened at a ground contacting top surface of the first land portion via a chamfer portion, the chamfer portion comprising
a first sloped surface continued from the first sipe wall, and
a second sloped surface continued from the second sipe wall, wherein,
  in a top view of the first land portion, a width W1 of the first sloped surface is larger than a width W2 of the second sloped surface.
Disclosure 2: The tire according to Disclosure 1, wherein
  the width W1 of the first sloped surface is constant over at least 70% of the first sipe wall in the longitudinal direction of the sipe.
Disclosure 3: The tire according to Disclosure 1 or 2, wherein
  the width W1 of the first sloped surface is in a range from 1.5 to 3.5 times the width W2 of the second sloped surface.
Disclosure 4: The tire according to Disclosure 1, 2 or 3, wherein
  the first land portion is further provided with second lateral sipes extending in a tire axial direction,
  the second lateral sipes extend from the second edge,
  the first lateral sipes extend from the first edge, and
  the first lateral sipes and the second lateral sipes are inclined in the same direction with respect to the tire axial direction.
Disclosure 5: The tire according to any one of Disclosures 1 to 4, wherein
  the first land portion is provided with second lateral sipes extending in a tire axial direction,
  each of the second lateral sipes has
a first sipe wall positioned on the first side in the tire circumferential direction, and
a second sipe wall positioned on the second side in the tire circumferential direction,
  each of the second lateral sipes is opened at the ground contacting top surface of the first land portion via a chamfer portion,
  the chamfer portion comprises
a first sloped surface continued from the first sipe wall, and
a second sloped surface continued from the second sipe wall,
  a width W3 of the first sloped surface is smaller than a width W4 of the second sloped surface,
  each of the first lateral sipes extends from the first edge and ends to have a closed end within the ground contacting top surface of the first land portion, and
  each of the second lateral sipes extends from the second edge and ends to have a closed end within the ground contacting top surface of the first land portion.
Disclosure 6: The tire according to Disclosure 5, wherein
  the first land portion has a first side wall on the first edge side, and a second side wall on the second edge side,
  in a plan view of the first land portion,
between the first side wall and the first sipe wall of each first lateral sipe, an obtuse-angled corner is formed,
between the first side wall and the second sipe wall of each first lateral sipe, an acute-angled corner is formed,
between the second side wall and the first sipe wall of each second lateral sipe, an acute-angled corner is formed, and
between the second side wall and the second sipe wall of each second lateral sipe, an obtuse-angled corner is formed.
Disclosure 7: The tire according to any one of Disclosures 4 to 6, wherein
  a maximum depth of the second lateral sipes is less than a maximum depth of the first lateral sipes.

Disclosure 8: The tire according to any one of Disclosures 1 to 7, wherein
  the mounting direction of the tire to a vehicle is specified whereby the tread portion has an outboard tread edge to be positioned away from the center of the vehicle body and an inboard tread edge to be positioned close to the center of the vehicle body,
  the tread portion is provided with four circumferential grooves continuously extending in the tire circumferential direction so as to axially divide the tread portion into five land portions,
  the five land portions include
a second land portion disposed on the tire equator, and
a third land portion including the inboard tread edge,
wherein
  the first land portion is positioned between the second land portion and the third land portion.
Disclosure 9: The tire according to Disclosure 8, wherein
  the circumferential grooved include a first circumferential groove between the first land portion and the second land portion,
  the second land portion is provided with first shallow grooves which extend from the first circumferential groove and end so as to have closed ends within the ground contacting top surface of the second land portion,
  in a plan view of the tread portion,
virtual zones formed by extending the first shallow grooves in their longitudinal directions respectively overlap with the first lateral sipes, and
axial lengths of the first shallow grooves are larger than axial lengths of the first lateral sipes.
Disclosure 10: The tire according to Disclosure 8 or 9, wherein
  the circumferential grooves include a second circumferential groove between the first land portion and the third land portion,
  the first land portion is provided with second lateral sipes which extend from the second edge and end so as to have closed ends within the ground contacting top surface of the first land portion,
  the third land portion is provided with second shallow grooves which extend from the second circumferential groove and end so as to have closed ends within the ground contacting top surface of the third land portion,
  in a plan view of the tread portion, virtual zones formed by extending the second shallow grooves in their longitudinal directions overlap with none of the second lateral sipes, and
axial lengths of the second shallow grooves are smaller than axial lengths of the second lateral sipes.
Disclosure 11: The tire according to any one of Disclosures 8 to 10, wherein
  the first land portion is provided with second lateral sipes extending in a tire axial direction, and
  axial lengths of the first lateral sipes are greater than axial lengths of the second lateral sipes.

DESCRIPTION OF THE REFERENCE SIGNS 2 tread portion
11 first land portion
11a first edge of first land portion
11b second edge of first land portion
1 is ground contacting top surface of first land portion
21 first lateral sipe
21a first sipe wall of first lateral sipe 21b second sipe wall of first lateral sipe
36 chamfered portion of first lateral sipe
36a first sloped surface
36b second sloped surface
W1 width of first sloped surface
W2 width of second sloped surface

The invention claimed is:

1. A tire comprising
a tread portion provided with four circumferential grooves continuously extending in a tire circumferential direction so as to axially divide the tread portion into five land portions,
the five land portions including
  a second land portion disposed on the tire equator,
  a third land portion including an inboard tread edge, and
  a first land portion between the second land portion and the third land portion,
the four circumferential grooves including
  a first circumferential groove between the first land portion and the second land portion, and
  a second circumferential groove between the first land portion and the third land portion,
the first land portion having a first edge and a second edge which extend in the tire circumferential direction, and a ground contacting top surface formed therebetween, wherein
the first land portion is provided with
  first straight lateral sipes extending in a tire axial direction from the first edge and ending to have closed ends within the ground contacting top surface of the first land portion, and
  second straight lateral sipes extending in a tire axial direction from the second edge and ending to have closed ends within the ground contacting top surface of the first land portion,
the first straight lateral sipes each have a first sipe wall positioned on a first side in the tire circumferential direction and a second sipe wall positioned on a second side in the tire circumferential direction,
the first straight lateral sipes are each opened at the ground contacting top surface of the first land portion via a chamfer portion,
the chamfer portion comprising a first sloped surface continued from the first sipe wall, and a second sloped surface continued from the second sipe wall,
the second straight lateral sipes each have a first sipe wall positioned on said first side in the tire circumferential direction, and a second sipe wall positioned on said second side in the tire circumferential direction,
the second straight lateral sipes are each opened at the ground contacting top surface of the first land portion via a chamfer portion,
the chamfer portion comprises a first sloped surface continued from the first sipe wall, and a second sloped surface continued from the second sipe wall,
in a top view of the first land portion,
  each of the first straight lateral sipes is configured so that a width W1 of the first sloped surface is larger than a width W2 of the second sloped surface, and
  each of the second straight lateral sipes is configured so that a width W3 of the first sloped surface is smaller than a width W4 of the second sloped surface,
in each of the first straight lateral sipes, the width W1 and the width W2 are respectively substantially constant along the length of the first straight lateral sipe, and
in each of the second straight lateral sipes, the width W3 and the width W4 are respectively substantially constant along the length of the second straight lateral sipe,
each of the first straight lateral sipes extends from the first edge toward the second edge of the first land portion while gradually increasing the groove depth to a maximum depth d3,
each of the second straight lateral sipes extends from the second edge toward the first edge of the first land portion while maintaining a constant depth defined as a maximum depth d4,
the maximum depth d4 is less than maximum depth d3,
the second land portion is provided with first shallow grooves extending from the first circumferential groove and ending to have closed ends within a ground contacting top surface of the second land portion,
the third land portion is provided with second shallow grooves extending from the second circumferential groove and ending to have closed ends within a ground contacting top surface of the third land portion, and
each of the first shallow grooves and the second shallow grooves has a V-shaped cross-sectional shape formed by a pair of opposite groove walls extending substantially straight from groove edges toward a groove bottom while inclining with respect to the tire radial direction to have an angle θ3 of from 80 to 100 degrees between the opposite groove walls and a depth d5 of from 0.5 to 1.5 mm between the groove edges and the groove bottom.

2. The tire according to claim 1, wherein the width W1 of the first sloped surface is in a range from 1.5 to 3.5 times the width W2 of the second sloped surface.

3. The tire according to claim 2, wherein the first straight lateral sipes and the second straight lateral sipes are inclined in a same direction with respect to the tire axial direction.

4. The tire according to claim 1, wherein the first straight lateral sipes and the second straight lateral sipes are inclined in a same direction with respect to the tire axial direction.

5. The tire according to claim 1, wherein
the first land portion has a first side wall on the first edge side, and a second side wall on the second edge side,
in the plan view of the first land portion,
between the first side wall and the first sipe wall of each first straight lateral sipe, an obtuse-angled corner is formed,
between the first side wall and the second sipe wall of each first straight lateral sipe, an acute-angled corner is formed,
between the second side wall and the first sipe wall of each second straight lateral sipe, an acute-angled corner is formed, and
between the second side wall and the second sipe wall of each second straight lateral sipe, an obtuse-angled corner is formed.

6. The tire according to claim 1, wherein a mounting direction of the tire to a vehicle is specified whereby the tread portion has an outboard tread edge to be positioned away from a center of the vehicle body and said inboard tread edge to be positioned close to the center of the vehicle body.

7. The tire according to claim 1, wherein axial lengths of the first shallow grooves are larger than axial lengths of the first straight lateral sipes.

8. The tire according to claim 7, wherein axial lengths of the second shallow grooves are smaller than axial lengths of the second straight lateral sipes.

9. The tire according to claim 7, wherein axial lengths of the first straight lateral sipes are greater than axial lengths of the second straight lateral sipes.

10. The tire according to claim 1, wherein axial lengths of the second shallow grooves are smaller than axial lengths of the second straight lateral sipes.

11. The tire according to claim 6, wherein axial lengths of the first straight lateral sipes are greater than axial lengths of the second straight lateral sipes.

12. The tire according to claim 1, wherein in a plan view of the tread portion,
virtual zones formed by extending the first shallow grooves in their longitudinal directions respectively overlap with the first straight lateral sipes, and
virtual zones formed by extending the second shallow grooves in their longitudinal directions overlap with none of the second straight lateral sipes.

13. The tire according to claim 1, wherein
the five land portions include a fifth land portion including an outboard tread edge, and a fourth land portion between the fifth land portion and the second land portion,
the third land portion is provided with first lateral grooves,
the fifth land portion is provided with second lateral grooves,
the first lateral grooves are each provided with a chamfer portion comprising
a small sloped surface extending from one of a pair of opposite groove walls of the first lateral groove to a ground contacting top surface of the third land portion, and
a larger sloped surface extending from the other of the pair of opposite groove walls of the first lateral groove to the ground contacting top surface of the third land portion,
the second lateral grooves are each provided with a chamfer portion comprising
a small sloped surface extending from one of a pair of opposite groove walls of the second lateral groove to a ground contacting top surface of the fifth land portion, and
a larger sloped surface extending from the other of the pair of opposite groove walls of the second lateral groove to the ground contacting top surface of the fifth land portion,
in the chamfer portion of each of the first lateral grooves, the small sloped surface is positioned on said first side in the tire circumferential direction with respect to the larger sloped surface, and
in the chamfer portion of each of the second lateral grooves, the small sloped surface is positioned on said second side in the tire circumferential direction with respect to the larger sloped surface.

14. The tire according to claim 13, wherein
the first lateral grooves extend axially inwardly from the inboard tread edge and end within the third land portion, and
the second lateral grooves extend axially inwardly from the outboard tread edge across the entire width of the fifth land portion.

15. The tire according to claim 1, wherein
in each of the first straight lateral sipes,
a distance between the radially outer edge of the first sloped surface of the first straight lateral sipe and the radially outer edge of the first sipe wall of the first straight lateral sipe when measured perpendicularly to the longitudinal direction of the first straight lateral sipe in the plan view of the first land portion is substantially constant over the substantially entire length of the first straight lateral sipe, and
a distance between the radially outer edge of the second sloped surface of the first straight lateral sipe and the radially outer edge of the second sipe wall of the first straight lateral sipe when measured perpendicularly to the longitudinal direction of the first straight lateral sipe in the plan view of the first land portion is substantially constant over the substantially entire length of the first straight lateral sipe,
in each of the second straight lateral sipes,
a distance between the radially outer edge of the first sloped surface of the second straight lateral sipe and the radially outer edge of the first sipe wall of the second straight lateral sipe when measured perpendicularly to the longitudinal direction of the second straight lateral sipe in the plan view of the first land portion is substantially constant over the substantially entire length of the second straight lateral sipe, and
a distance between the radially outer edge of the second sloped surface of the second straight lateral sipe and the radially outer edge of the second sipe wall of the second straight lateral sipe when measured perpendicularly to the longitudinal direction of the second straight lateral sipe in the plan view of the first land portion is substantially constant over the substantially entire length of the second straight lateral sipe.

* * * * *